US012692880B2

(12) United States Patent (10) Patent No.: US 12,692,880 B2
Maichl et al. (45) Date of Patent: Jul. 28, 2026

(54) VALVE MODULE SYSTEM

(71) Applicant: FESTO SE & CO. KG, Esslingen (DE)

(72) Inventors: Martin Maichl, Salach (DE); Martin Kilb, Leinfelden-Echterdingen (DE)

(73) Assignee: Festo SE & Co. KG, Esslingen (DE)

( * ) Notice: Subject to any disclaimer, the term of this patent is extended or adjusted under 35 U.S.C. 154(b) by 40 days.

(21) Appl. No.: 18/847,072

(22) PCT Filed: Feb. 21, 2023

(86) PCT No.: PCT/EP2023/054257
§ 371 (c)(1),
(2) Date: Sep. 13, 2024

(87) PCT Pub. No.: WO2023/174643
PCT Pub. Date: Sep. 21, 2023

(65) Prior Publication Data
US 2025/0043803 A1     Feb. 6, 2025

(30) Foreign Application Priority Data
Mar. 17, 2022   (DE) .................... 10 2022 106 224.4

(51) Int. Cl.
*F15B 13/08*          (2006.01)
*F15B 1/26*           (2006.01)
(Continued)

(52) U.S. Cl.
CPC .......... *F15B 13/0839* (2013.01); *F15B 1/265* (2013.01); *F15B 19/00* (2013.01);
(Continued)

(58) Field of Classification Search
None
See application file for complete search history.

(56) References Cited

U.S. PATENT DOCUMENTS

| | | | |
|---|---|---|---|
| 5,320,497 A | 6/1994 | Nagai et al. | |
| 2009/0212247 A1* | 8/2009 | Inaba .................... | F16K 31/426 |
| | | | 251/129.15 |

(Continued)

FOREIGN PATENT DOCUMENTS

| | | |
|---|---|---|
| CN | 102395799 | 3/2012 |
| CN | 114110247 | 3/2022 |

(Continued)

OTHER PUBLICATIONS

Office Action issued in corresponding Taiwanese Patent Application No. 112109759, Dec. 12, 2024, 16 pages w/translation.
(Continued)

*Primary Examiner* — Atif H Chaudry
(74) *Attorney, Agent, or Firm* — HSML P.C.

(57) ABSTRACT

A valve module system for supplying compressed air to a compressed air consumer, in which valve modules are provided with differently configured channel plates in order to enter into fluidic communication with fluid channels of a support plate. At least one fluid channel configured in the support plate, which opens out at a coupling surface of the support plate, is associated with a sensor from the group of a: pressure sensor, a temperature sensor, a flow sensor, a humidity sensor, which is electrically connected to a control apparatus and which is configured for providing an electrical sensor signal to the control apparatus.

19 Claims, 4 Drawing Sheets

(51) Int. Cl.
| | |
|---|---|
| *F15B 19/00* | (2006.01) |
| *F16K 11/22* | (2006.01) |
| *F16K 11/24* | (2006.01) |
| *F16K 24/00* | (2006.01) |
| *F16K 37/00* | (2006.01) |

(52) U.S. Cl.
CPC .............. *F16K 11/22* (2013.01); *F16K 11/24* (2013.01); *F16K 24/00* (2013.01); *F16K 37/005* (2013.01)

(56)                    References Cited

U.S. PATENT DOCUMENTS

| | | | |
|---|---|---|---|
| 2010/0181510 A1* | 7/2010 | Yoshimura .......... | F16K 11/0704 251/129.01 |
| 2012/0037250 A1 | 2/2012 | Berner et al. | |
| 2014/0182725 A1 | 7/2014 | Maichl et al. | |
| 2018/0112688 A1* | 4/2018 | Ottliczky .............. | F16K 27/003 |
| 2022/0066480 A1 | 3/2022 | Falkenhahn et al. | |

FOREIGN PATENT DOCUMENTS

| | | |
|---|---|---|
| DE | 91 06 236 U1 | 9/1992 |
| DE | 42 09 337 | 1/1993 |
| DE | 102 03 792 | 8/2003 |
| DE | 102 13 397 | 10/2003 |
| DE | 10 2007 040 929 | 6/2008 |
| DE | 10 2009 017 877 | 10/2010 |
| DE | 10 2019 217 068 | 5/2021 |
| EP | 1 526 288 | 4/2005 |
| EP | 2 024 648 | 9/2010 |
| EP | 2 140 183 | 6/2011 |
| JP | 5-26367 | 2/1993 |
| WO | WO-2008138373 A1 * 11/2008 .......... F16K 27/003 |  |
| WO | 2013/013760 | 1/2013 |
| WO | 2016/124210 | 8/2016 |

OTHER PUBLICATIONS

Examination Report issued in corresponding German Patent Application No. 10 2022 106 224.4, Nov. 14, 2022, 8 pages.
International Search Report issued in International Application No. PCT/EP2023/054257 filed May 10, 2023, 5 pages w/translation.
Written Opinion issued in International Application No. PCT/EP2023/054257 filed May 10, 2023, 7 pages.
Office Action issued in corresponding Japanese Patent Application No. 2024-553614, Feb. 25, 2026, 6 pages w/translation.

* cited by examiner

VALVE MODULE SYSTEM

The invention relates to a valve module system for supplying compressed air to a compressed air consumer.

Such a valve module system is marketed by the applicant, for example, under the product name valve terminal CPV and is intended for use in automation technology in order to supply or vent one or more compressed air consumers, which may be pneumatic cylinders or other pneumatic actuators, for example, with compressed air in a focused way.

SUMMARY OF INVENTION

The object of the invention is to provide a valve module system that can be flexibly adapted to different requirements with regard to the compressed air consumer to be supplied.

This object is solved for a valve module system in that the valve module system comprises a support plate which support plate is provided with one or more interfaces at an interface area, each interface being configured for attaching a valve module and comprising a connection area which connection area is provided with a plurality of channel openings, wherein each channel opening is connected to a fluid channel provided in the support plate, and to one or more valve modules, wherein each of the valve modules comprises a valve housing in which valve housing one or more valve assemblies are accommodated and which valve housing is supported with a narrow side partly on the respective interface, and wherein the valve module system further comprises a channel plate, which channel plate is sealingly connected to the valve housing by a first coupling surface and which channel plate bears sealingly against the connection area by a second coupling surface aligned in particular parallel to the narrow side, a plurality of connection channels being formed in the channel plate, which plurality of connection channels are each formed for a connection between one of the valve assemblies and one of the channel openings, wherein at least one fluid channel formed in the support plate, which fluid channel opens out at a coupling surface of the support plate, which fluid channel is associated with a sensor from the group of: a pressure sensor, a temperature sensor, a flow sensor, a humidity sensor, which sensor is electrically connected to a control apparatus and which sensor is configured to provide an electrical sensor signal to the control apparatus.

The object of the support plate is first of all to mechanically fix the at least one valve module, in particular a plurality of valve modules, the plurality of valve modules preferably being lined up adjacent to one another along a line-up direction with opposite side surfaces. Preferably, the valve housings of the valve modules have two side surfaces aligned parallel to one another, these side surfaces being connected to one another by narrow sides, at least one of these narrow sides being provided on the interface of the support plate. Preferably, this narrow side is configured flat and the corresponding interface on the support plate is configured flat, too.

Several fluid channels run in the support plate, which are configured for supplying fluid or discharging fluid to the channel openings provided in the connection area of the interface. Preferably, the valve housing is dimensioned in such a way that it does not cover the connection area with the channel openings provided there, so that free access to the channel openings is ensured when the valve housing is mounted on the support plate.

The valve housing can, for example, be rectangular in shape and comprise several pits on one end face, which end face is aligned perpendicular to the narrow side intended to rest on the support plate, which pits are spaced apart from each other, in particular at a constant pitch, and aligned parallel to each other. The parallel alignment of the pits results from the fact that each of the pits extends into the valve housing in the manner of a recess along an axis of extension and the axes of extension of the pits are aligned parallel to one another. Furthermore, it is provided that orifices of the pits, which orifices are also referred to as pit openings, are arranged in a common pit opening plane aligned transversely to the narrow side. Preferably, it is provided that the pits are formed along the respective length axis, at least in sections, with a constant profile which is selected such that a valve assembly can be inserted into each of the pits.

By way of example only, the valve assembly includes a first valve connection and a second valve connection, each of which delimits an orifice of an associated control channel. In this context, it is provided that a first control channel is assigned to the first valve connection and that a second control channel is assigned to the second valve connection. Furthermore, it is provided that a valve seat and an electrically controllable valve member which can be moved between a closed position for the valve seat and an open position for the valve seat are arranged in at least one control channel, so that a cross-section of the respective control channel can be changed. Preferably, the valve member exposes a maximum cross-section of the control channel in the open position and completely closes the control channel in the closed position.

It is further provided that the valve module system comprises an interchangeably configured channel plate, the task of which is to establish a fluidically communicating connection between the respective valve assembly and the associated connection area with the channel openings provided therein. For this purpose, the channel plate comprises a first coupling surface which is in sealing contact with the orifice of the pit or in sealing contact with the front surface of the valve assembly accommodated in the respective pit and in particular ensures a sealing coupling between the first valve connection and a connection channel configured in the channel plate, in particular a first connection channel, and the second valve connection and a further connection channel configured in the channel plate or the first connection channel. It is provided that the connection channels are in fluidic communication with a respective channel opening of the connection area at a second coupling surface aligned parallel to the narrow side of the valve housing and that the second coupling surface is in sealing contact with the connection area. Preferably, the channel plate is cuboid in shape and the first coupling surface and the second coupling surface are each configured to be flat and aligned perpendicular to each other.

Depending on an assignment between the first valve connection and one or more of the channel openings as well as the second valve connection and one or more other channel openings of the connection area, which is formed via the respective connection channels, different functions can be configured for the respective valve assembly or several valve assemblies associated with the respective valve module. For this purpose, it is intended in particular to select a channel plate equipped with a corresponding course of the connection channels from a plurality of differently configured channel plates and to assign this channel plate to the respective valve module and the associated connection area.

The at least one sensor can be used, for example, to determine a supply pressure of a compressed air source or a working pressure for a compressed air consumer or a temperature or a volume flow or a moisture content of a gas stream flowing in the fluid channel. The electrical sensor signal provided by the sensor is fed to the control apparatus via a sensor line and can be processed there. For example, the control apparatus can be configured to carry out pressure control for a fluid pressure prevailing in the fluid channel. For this purpose, the valve assembly that is fluidically coupled to this fluid channel is actuated accordingly. For example, it may be provided that several sensors are assigned to a fluid channel, whereby these sensors are arranged at a spatial distance from each other and can be configured to detect the same or different physical variables. Additionally, or alternatively, it may be provided that several fluid channels of the support plate are each assigned the same or alternatively different sensors or that several fluid channels of the support plate are each assigned several sensors in the same or different constellation.

Advantageous embodiments of the invention are the subject of the dependent claims.

Preferably, the sensor is provided on a sensor board, which sensor board is fixed to the support plate. The sensor board, which is preferably made of a rigid, plate-shaped material, serves as a mechanical carrier for the sensor and comprises electrically conductive conductor paths in the manner of a printed circuit, which are configured for the electrical connection between the sensor and the control apparatus. Preferably, the sensor board is a fiber-reinforced plane-parallel plate made of a plastic material with conductive contact surfaces and/or conductive tracks made of an electrically conductive material, in particular copper, on at least one surface. The control apparatus can, for example, be configured as a microcontroller or microprocessor and be arranged on the sensor board. Preferably, the control apparatus is attached to the sensor board and is electrically connected to the at least one sensor via the conductor tracks. Alternatively, the control apparatus can be arranged on a separately configured control board, which is, e.g., electrically coupled to the sensor board via a plug connection.

Preferably, the sensor board is positioned on a bottom side of the support plate facing away from the interface area, and wherein a mounting surface of the sensor board opposite the support plate is equipped with a predetermined configuration of sensors, wherein the sensors are each fluidically communicatingly connected to the respective fluid channel. In this case, it is provided that the assembly for the sensors, which are arranged on the mounting surface of the sensor board, is adapted to the geometry of the bottom side of the support plate in such a way that the sensors are each accommodated in a sealing manner in corresponding recesses in the support plate, wherein these recesses are each connected directly to the associated fluid channel. For example, a recess in the support plate is adapted to the geometry of a sensor in such a way that it can extend from the sensor board into the fluid channel, as for example can be provided for a flow sensor. Furthermore, depending on the respective placement of the sensor board, a blind plug, also configured as a placement component, can be provided at those placement locations where no sensor is provided, which closes the respective recess in the support plate in a sealing manner.

Preferably, the sensor is connected to a sensor channel which sensor channel branches off from the fluid channel and which sensor channel opens out at the bottom side of the support plate, and wherein the sensor is accommodated in a sealing manner in an end region of the sensor channel. Such a sensor channel, which can also be referred to as a stub, enables a reliable determination of a physical variable for the fluid present in the fluid channel, for example a pressure determination for the pressure prevailing in the fluid channel, but avoids an undesirable inclusion of dynamic flow components, since there is no significant fluid flow in the sensor channel, which means that a more precise measurement result can be expected compared to a sensor placed directly in the fluid channel. In particular, it is intended that the sensor is accommodated in a sealing manner in an end region of the sensor channel.

According to another embodiment of the invention,
a fluid channel formed in the support plate comprises a throttle, wherein a first pressure sensor is configured to provide a first pressure-dependent electrical sensor signal and is assigned to a first end region of the throttle, and wherein a second pressure sensor is configured to provide a second pressure-dependent electrical sensor signal and is assigned to a second end region of the throttle, and wherein the first pressure sensor and the second pressure sensor are electrically connected with the control apparatus, which control apparatus is configured to process the first sensor signal and the second sensor signal. According to this embodiment, the throttle, the first pressure sensor and the second pressure sensor form a device for flow measurement in the fluid channel. It is not necessary for the throttle to comprise a reduced cross-section compared to the rest of the fluid channel. Rather, it is sufficient if the flow resistance for the throttle is known in order to be able to determine a pressure difference on the basis of the sensor signals of the sensors, which are each arranged at the end of the throttle, and to be able to calculate the desired flow measurement from this. The first pressure sensor and the second pressure sensor can also be replaced by a differential pressure sensor.

Preferably, a fluid coupling is associated with the fluid channels discharging at the coupling surface. The fluid channels discharging at the coupling surface and each provided with a fluid coupling thus enable the connection of fluid lines, in particular flexible fluid hoses, which can be connected, for example, to a compressed air source or a vacuum source or a working connection of a compressed air consumer. The fluid couplings thus form the fluid interfaces between the valve module system and associated supply devices and compressed air consumers. Preferably, each fluid channel configured in the support plate opens out at the coupling surface and is provided with an associated fluid coupling.

Preferably, the connection area comprises a first orifice and an associated first fluid channel is connected to a first working connection arranged on the coupling surface, and that the connection area comprises a second orifice and an associated second fluid channel is connected to a second working connection arranged on the coupling surface, and that the connection area comprises a third orifice and an associated third fluid channel is connected to a first working connection, preferably a compressed air connection, arranged on the coupling surface, and that the connection area comprises a fourth orifice and an associated fourth fluid channel is connected to a second fluid connection, preferably being an exhaust air connection, arranged on the coupling surface. With this configuration of orifices provided at the connection area and connections arranged at the coupling surface, a typical operating mode for a valve module system can be realized. For example, a compressed air source is connected to the first fluid connection on the coupling surface, which is connected to several third orifices in several connection areas via the associated third fluid channel. The same applies to the second fluid connection configured on the coupling surface, which is connected to several fourth orifices in several connection areas via the fourth fluid channel and can, for example, be used as a venting channel. In contrast, the first fluid channel and the second fluid channel are each provided as a direct connection between the first or second orifice assigned to a single connection area and a first or second working connection assigned to the coupling surface.

According to an embodiment of the invention, a, preferably plate-shaped, seal is arranged between the second coupling surface of the channel plate and the connection area, which seal is configured for individual sealing between the orifices and the respective associated connection channels. For this purpose, the seal, which is preferably made of a rubber-elastic material or comprises at least sealing areas configured to be rubber-elastic, is penetrated by several channels, each of which has the task of ensuring the fluidic coupling between a connecting channel and an associated orifice, while the sealing section configured around the respective channel ensures the sealing for this fluidically communicating connection.

According to another embodiment of the invention, the valve housing comprises one or more pits which one or more pits are aligned parallel to one another and whose pit openings are arranged in a common pit opening plane aligned transversely to the narrow side, the pits each accommodating valve assemblies which valve assemblies comprise a first valve connection and a second valve connection on a front surface arranged in the region of the pit opening, wherein in a first control channel associated with the first valve connection and in a second control channel associated with the second valve connection a valve seat and an electrically controllable valve member movable between a closed position for the valve seat and an open position for the valve seat is arranged, and wherein the channel plate comprises an individual fluidic connection of the first valve connection, the second valve connection and a supply connection with a respectively assigned connection channel for each valve assembly accommodated in the valve housing.

This ensures for each valve assembly that there is a fluidic separation between the first valve connection, the second valve connection and the supply connection both in the channel plate and in the support plate. On the other hand, it may be provided that adjacent valve assemblies arranged in a common valve housing also access one or more of the connection channels configured in the channel plate with their respective first valve connection or second valve connection or supply connection.

Preferably, the channel plate sealingly abuts against a valve housing front surface, through which valve housing front surface the pit openings pass, and which channel plate delimits with the pits a pressure chamber, in which pressure chamber the at least one valve assembly is accommodated. As an example, it is provided that a plate-shaped rubber-elastic seal is arranged between the channel plate and the valve housing front surface, which is penetrated by the pits and on which the pit openings are configured, the seal either being such that all the pits covered by the channel plate form a common pressure chamber or that each pit covered by the channel plate forms a separate pressure chamber or that groups of pits form a common pressure chamber. Alternatively, it may be provided that a front surface of the channel plate opposite the valve housing front surface in the assembled state is provided with ring-shaped seals made of rubber-elastic material, which are configured to seal each pit opening individually, so that a separate pressure chamber is created for each valve assembly. According to a further alternative, each of the pit openings can be surrounded by an annular seal made of rubber-elastic material, against which the front surface of the channel plate is pressed in a sealing manner in the assembled state, so that a separate pressure chamber is also created for each valve assembly. Preferably, a common pressurization or vacuum is provided for each of the pressure chambers via a corresponding connection channel in the channel plate.

According to an alternative embodiment, the valve assembly bears with a circumferential seal in a sealing manner against an inner surface of the pit, wherein the valve assembly delimits a pressure chamber with the pit, and that the supply connection is connected to the pressure chamber and is configured on the valve housing or on the front surface of the valve assembly, which supply connection communicates fluidically with a connection channel in the channel plate. Preferably, the valve assembly is configured in the manner of a cartridge, which is not operable on its own, but is only put into a functional state when mounted in the pit of the valve housing. This is due to the fact that the valve assembly does not comprise an independent, pressure-tight housing, but is rather dependent on the sealing receptacle in the pit. For this purpose, the valve assembly is provided with a circumferential seal that seals against the inner surface of the pit, thereby defining a pressure chamber with the pit. The first control channel, which is assigned to the first valve connection, and the second control channel, which is assigned to the second valve connection, extend from this pressure chamber. It is also provided that a valve seat and an electrically controllable valve member are arranged in both the first control channel and the second control channel. A supply connection is provided for supplying the pressure chamber with compressed air or a process gas or process gas mixture or negative pressure, via which the pressure chamber can be supplied with positive pressure or negative pressure. In the case of sealing between the channel plate and the valve housing, the supply connection can be configured on the channel plate and can communicate fluidically with an assigned channel opening in the connection area via an assigned connection channel in the channel plate. If the valve assembly is accommodated in the respective pit with a circumferential seal, thereby limiting the pressure chamber, the supply connection can be configured either on the valve housing or on the front surface of the valve assembly and in this case is in fluidic communication with an assigned channel opening in the connection area via an assigned connection channel in the channel plate.

Preferably, a valve seat and an electrically controllable valve member are arranged in the first control channel, wherein the electrically controllable valve member can be moved between a closed position for the valve seat and an open position for the valve seat, and wherein a valve seat and an electrically controllable valve member are arranged in the second control channel, wherein the electrically controllable valve member can be moved between a closed position for the valve seat and an open position for the valve seat. In this way, a fluidically communicating connection between the pressure chamber and the first valve connection and between the pressure chamber and the second valve connection can be set or completely interrupted depending on the position of the respective valve member. In this case, the first valve member, which is assigned to the first control channel, and the second valve member, which is assigned to the second control channel, can be controlled independently of each other by corresponding electrical signals in order to enable an individual setting of a cross-section for both the first control channel and the second control channel.

According to another embodiment of the invention, the channel plate comprises a first connection channel, which first connection channel is connected to a first valve connection of a first valve assembly and to a first valve connection of a second valve assembly, a second connection channel, which second connection channel is connected to a second valve connection of the first valve assembly and to a second valve connection of the second valve assembly, a third connection channel, which third connection channel is connected to the supply connection of the first valve assembly, and a fourth connection channel, which fourth connection channel is connected to the supply connection of the second valve assembly. As an example, it is provided that the first connecting channel is connected to a connecting channel configured in the support plate and discharging at the coupling surface, which is also referred to as the first working channel. Furthermore, it may be provided that the second connecting channel is connected to a fluid channel configured in the support plate and discharging at the coupling surface, which is referred to as the second working channel. Here, the first valve assembly, which comprises two 2/2-way valves, and the second valve assembly, which also comprises two 2/2-way valves, combine to form a 4/3-way valve that can be operated in the manner of a full bridge structure. In this way, aeration or venting can be ensured individually for the first connection channel and for the second connection channel, provided that the third connection channel is connected to a compressed air source and the fourth connection channel is configured as an exhaust air connection.

According to an alternative embodiment of the invention, the channel plate comprises a first connection channel, which first connection channel is connected to a first valve connection and a second valve connection of a first valve assembly and to a first valve connection and a second valve connection of a second valve assembly, and a second connection channel, which second connection channel is connected to the supply connection of the first valve assembly and comprises a third connection channel, which third connection channel is connected to the supply connection of the second valve assembly. This ensures that compressed air is supplied via the second connection channel and exhaust air is discharged via the third connection channel, so that the compressed air consumer connected to the first connection channel with its working connection can be aerated by activating the first valve assembly and vented by activating the second valve assembly, and in both cases twice the flow rate can be provided, as both valve members of the respective valve assembly are activated. Furthermore, a redundant mode of operation can be realized in this way, since both the ventilation and the venting can be carried out via two valve members of the respective valve assembly that can be controlled independently of each other.

According to another alternative embodiment of the invention, the channel plate comprises a first connection channel, which first connection channel is connected to a first valve connection of a first valve assembly and to a first valve connection of a second valve assembly, a second connection channel, which second connection channel is connected to a second valve connection of the first valve assembly and to a second valve connection of the second valve assembly, and a third connection channel, which third connection channel is connected to the supply connection of the first valve assembly and to the supply connection of the second valve assembly. In this configuration of the channel plate, both the first valve assembly and the second valve assembly can each supply a compressed air consumer via the first or second connection channel, wherein both of these compressed air consumers are supplied exclusively with compressed air and no venting is provided. Such compressed air consumers can, for example, be configured as compressed air motors.

According to another alternative embodiment of the invention, the channel plate comprises a first connection channel, which first connection channel is connected to a first valve connection and a second valve connection of a first valve assembly and to a first valve connection and a second valve connection of a second valve assembly, and a second connection channel, which second connection channel is connected to the supply connection of the first valve assembly and to the supply connection of the second valve assembly. In such a configuration of the channel plate, for example, a compressed air consumer can be supplied with pressure, in which both valve assemblies either block or release a fluidically communicating connection between the second connection channel, which is connected in particular to a compressed air source, and the first connection channel, which serves as a working connection. In this case, the first valve assembly and the second valve assembly can be used for flow control.

Preferably, the valve member is connected to a piezo drive, preferably to a piezo bender, and that the piezo drive is coupled to a power supply, which is electrically connected to the control apparatus, wherein the control apparatus is configured to provide control signals for controlling the piezo drive. High-precision proportional valve functions can be realized with a piezo drive, in particular with a strip-shaped piezo bender (monomorphic, bimorphic, trimorphic, with or without an electrically conductive intermediate layer). The valve member configured as a sealing element is attached to an end region of the piezo drive, which is fixed in the valve assembly, for example via a spring-mounted three-point bearing. In order to cause deformation of the piezo drive, in particular the piezo bender, an electrical voltage is required which must be provided by a power supply, whereby this power supply is typically configured to provide an electrical voltage in the range from 100 volts to 1000 volts. This power supply is electrically connected to a control apparatus, which influences the amount of electrical energy to be provided to the piezo drive by the power supply. Preferably, the power supply and the control apparatus are configured as components of an electronic circuit, with the control apparatus being configured in particular as a microprocessor. It is particularly preferred that the power supply and the control apparatus are positioned and configured on a common printed circuit (printed circuit board).

BRIEF DESCRIPTION OF DRAWINGS

An advantageous embodiment of the invention is shown in the drawing. Here shows.

DETAILED DESCRIPTION OF THE INVENTION

Figures 1, 2:
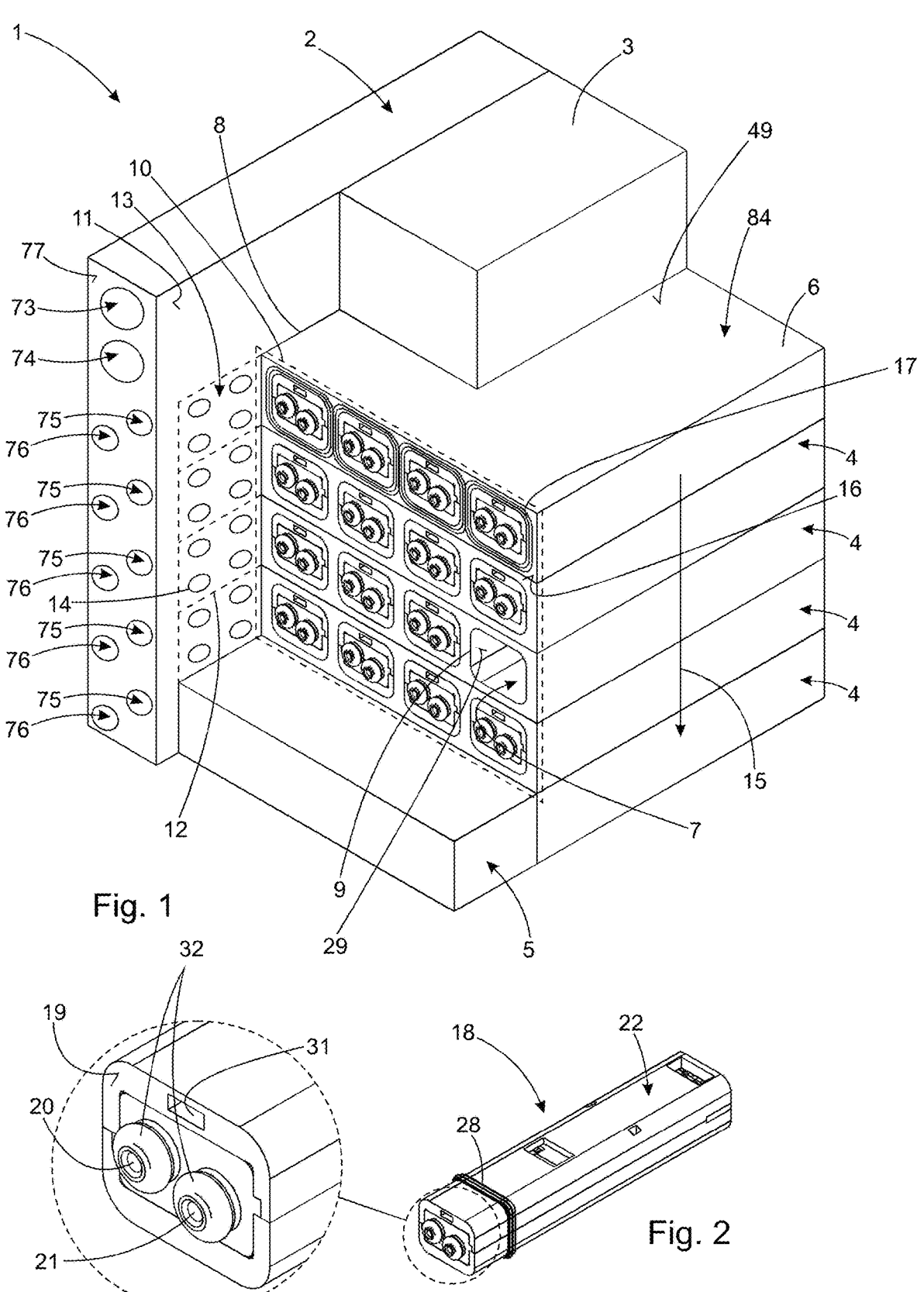
FIG. 1 a schematic and perspective view of a valve module system.
FIG. 2 a schematic and perspective view of a valve assembly.

A valve module system 1 shown in FIG. 1 is intended for the fluidic supply of several compressed air consumers not shown and is only shown partially assembled to illustrate its structure. By way of example only, the valve module system 1 comprises a support plate 2 to which, in addition to a communication unit 3, several valve modules 4 arranged along a line-up axis 15 and associated channel plates 5 can be attached. As an example, only a single channel plate 5 is assigned to one of the valve modules 4 as shown in FIG. 1, while the other valve modules 4 are not provided with a channel plate 5 for illustrative reasons. The communication unit 3 enables the valve module system 1 to be connected to a communication system not shown, in particular from the group: OPC UA (Open Platform Communication Unified Architecture), bus communication system, IO Link, via which data can be exchanged, for example with a higher-level control system, in particular a programmable logic controller (PLC), or with a control level or a cloud.

Each of the valve modules 4 comprises a valve housing 6, in which, by way of example only, four pits 7 are configured, which are provided to receive valve assemblies 18 formed in the shape of shells or cartridges. A profile of the respective valve assembly 18 is adapted to a profile of the pit 7 shown in FIG. 1, which is not mounted with a valve assembly 18, so that the valve assembly 18 can be inserted into the respective pit 7. The valve assembly 18 is configured in such a way that it can only be used to control fluid flows when it is installed in the pit 7. Accordingly, the valve assembly 18 comprises a circumferential seal 28, which is configured for sealing contact with an inner surface 29 of the pit 7. The valve assembly 18 and the pit 7 thus delimit a pressure chamber 30 shown in more detail in FIG. 4.

A first valve connection 20, a second valve connection 21 and a supply connection 31 are configured on a front surface 19 of the valve assembly 18 and are shown closer in the detailed illustration in FIG. 2. By way of example only, the first valve connection 20 and the second valve connection 21 each comprise a rubber-elastic sealing ring 32, while supply connection 31 is configured by way of example only as a rectangular cut-out in the front surface 19 of the valve assembly 18. The valve assemblies 18 are inserted into the pits 7 of the valve housing 6 in such a way that the front surfaces 19 of the respective valve assembly 18 are aligned flush with a pit opening plane 10 of the respective valve housing 6. The pit opening plane 10 is the plane in which the pit openings 9 of the pits 7 are positioned.

The valve housings 6, which are configured by way of example in a rectangular shape, lie flat on the interface area 11, which is configured by way of example in a flat shape, with a narrow side 8 aligned perpendicular to the pit opening plane 10. The valve housings 6 are fixed to the support plate 2 with fastening members not shown, wherein a defined position is provided for each valve housing 6 on the support plate 2, which is also referred to as interface 12. This interface 12 also comprises a connection area 13, configured for example as a rectangle, which is not covered by the valve housing 6 and at which several channel openings 14 are discharging. Each of the channel openings 14 is connected to a fluid channel 33 to 36 configured in the support plate 2, as shown in more detail in FIG. 4. For a fluidically communicating connection between the valve assemblies 18 and the channel openings 14 in the connection area 13, a channel plate 5 is provided for each valve module 4, wherein only one of these channel plates 5 is shown in FIG. 1 for reasons of clarity.

The channel plate 5 is fixed to the respective valve housing 6 and to the interface 12 of the support plate 2 in a way not shown in detail and ensures a fluid-tight connection between the first valve connection 20, the second valve connection 21, the supply connection 31 of the respective valve assembly 18 and the respective associated channel opening 14.

According to an alternative embodiment of a valve module 84, as shown in FIG. 1 at the top of the row of valve modules 4, 84, an individual seal is ensured for each pit 7 with an annular seal 17 positioned around the respective pit opening 9 in a recess of a valve housing front surface 16 when the channel plate 5 is in contact. Since in this case the pressure chamber is delimited by the channel plate 5, the seal 17 and the pit 7, the seal 28 provided on the valve assembly 18 and the supply connection 31 can be omitted, since a supply to the valve assembly 18 can be realized through the supply shaft 40 in the channel plate shown in FIG. 3, which opens out into this pressure chamber.

Figure 4:
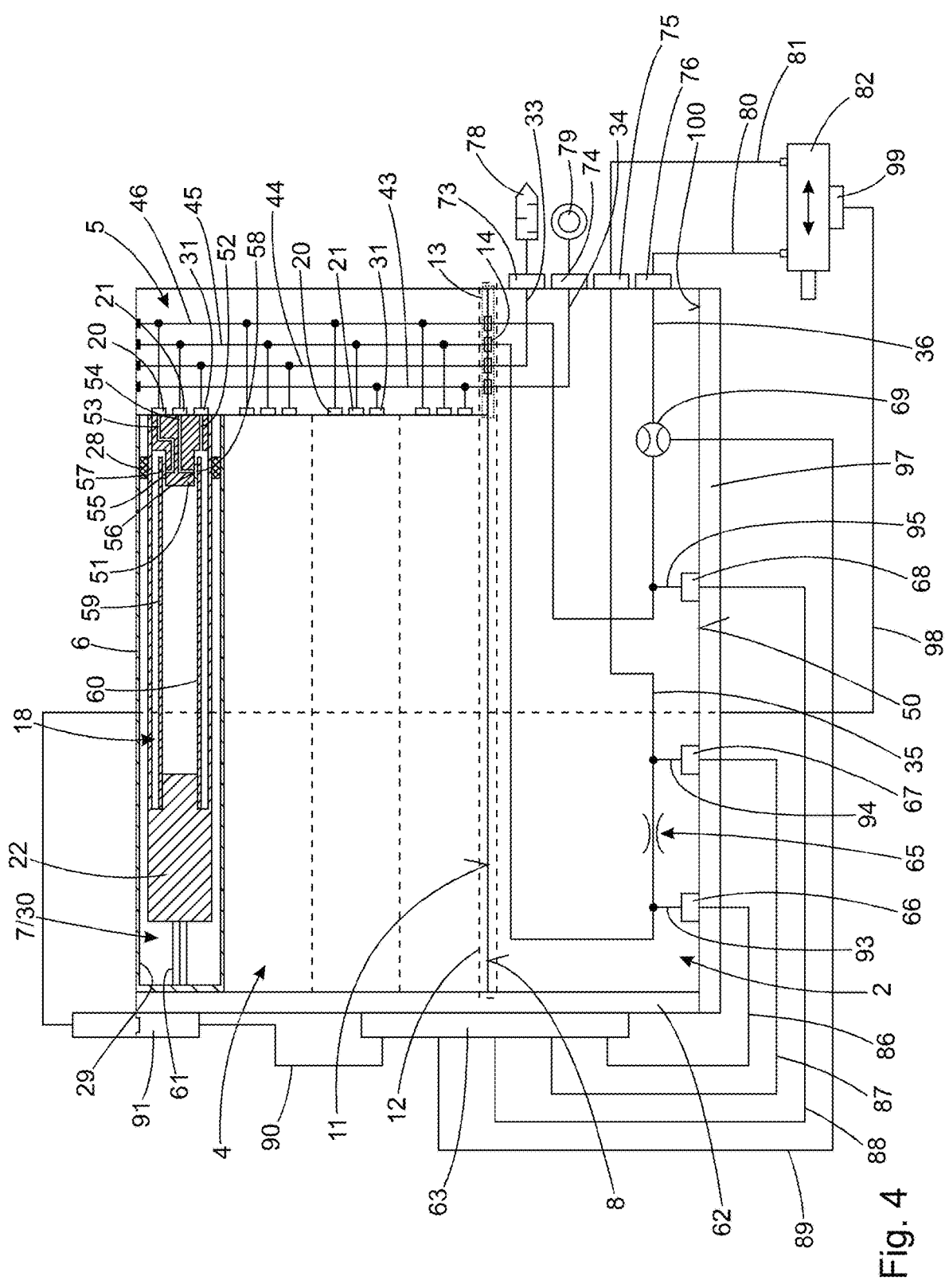
FIG. 4 a schematic view of the fluidic and electrical circuitry in the valve module system as shown in FIG. 1, FIG. 5 a first embodiment of a channel plate, which is provided for coupling to 2 adjacent valve assemblies, FIG. 6 a second embodiment of such a channel plate, FIG. 7 a third embodiment of such a channel plate, FIG. 8 a fourth embodiment of such a channel plate, FIG. 9 a second assembly option for the sensors in the support plate, and FIG. 10 a third assembly option for the sensors in the support plate.

The fluid channels 33 to 36 provided in the support plate 2 end at a front surface of the support plate 2, which is also referred to as a coupling surface, as shown schematically in FIG. 4. Each of the fluid channels 33 to 36 open out at a coupling surface 77 of the support plate 2 and in each case forms a fluid interface 73, 74, 75, 76, which is provided with a fluid coupling, not shown, which enables, for example, a fluid hose, not shown, to be connected.

Figures 3, 9, 10:
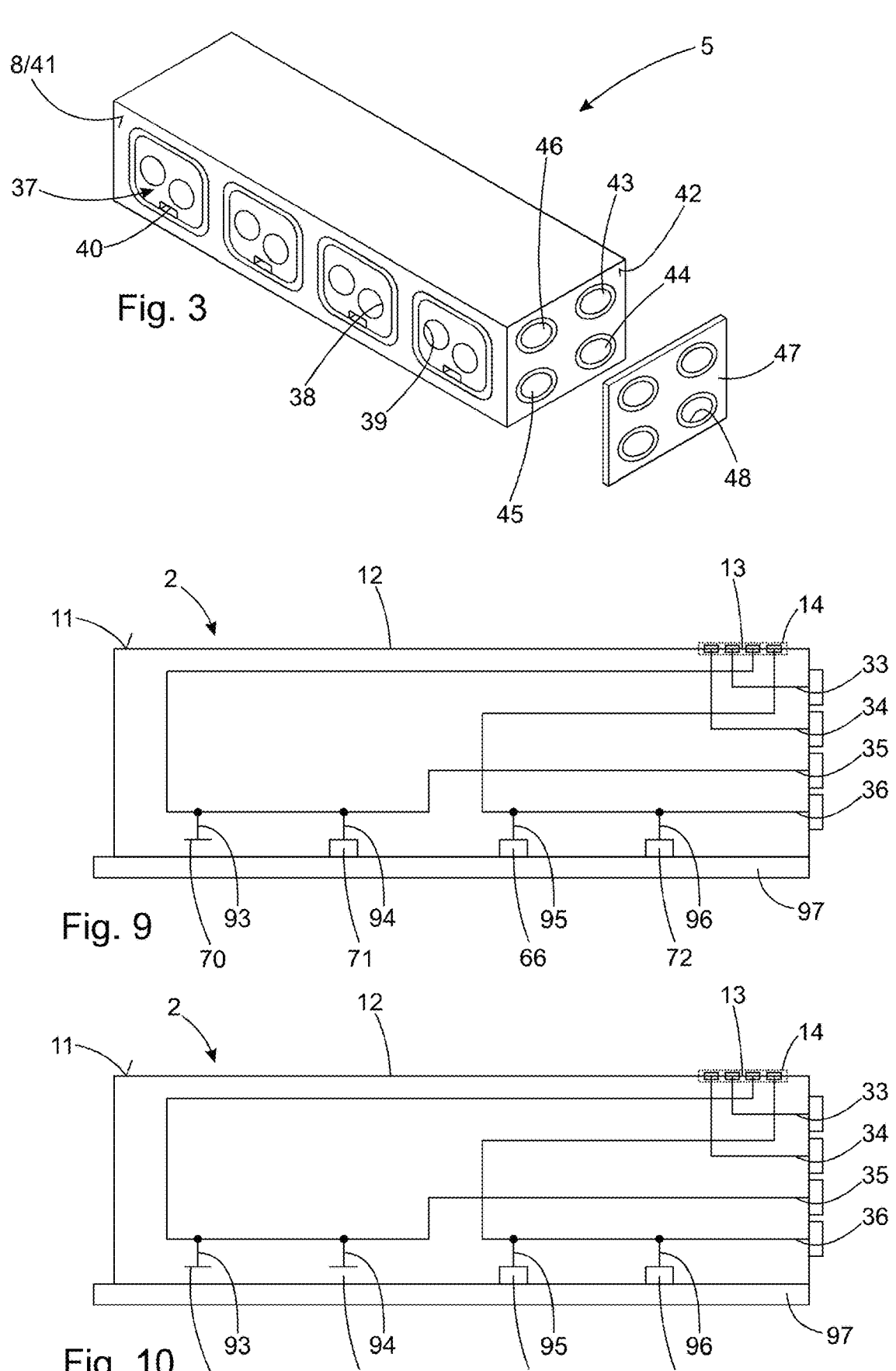
FIG. 3 a schematic and perspective view of a channel plate.

FIG. 3 shows a schematic perspective view of a channel plate 5. The channel plate 5 comprises a total of four valve interfaces 37, which are arranged with the same pitch as the pits 7 in the valve housing 6. Each of the valve interfaces 37 is provided for a fluid-tight coupling with an associated valve assembly 18. As an example, each of the valve interfaces 37 comprises a first receiving bore 38 and a second receiving bore 39 and a supply shaft 40. The first receiving bore 38 serves to receive the sealing ring 32 of the first valve connection 20, while the second receiving bore 39 serves to receive the sealing ring 32 of the second valve connection 21 in a sealing manner. When using the channel plate 5 in combination with the valve module 4, the supply shaft 40 can be used for a fluid-tight coupling with the supply connection 31 on the front surface 19 of the valve assembly 18. When the channel plate 5 is used in combination with the valve module 84, the supply shaft can be used for a fluid supply into the pressure chamber delimited by the channel plate 5, the seal 17 and the pit 7.

The preferably flat configured surface of the channel plate 5 provided with the valve interfaces 37 is also referred to as the first coupling surface 41. A second coupling surface 42, which is aligned purely by way of example perpendicular to the first coupling surface 41 and comprises a flat surface, serves to bear on the connection area 13 of the interface 12. A first connection channel 43, a second connection channel 44, a third connection channel 45 and a fourth connection channel 46 open out at the second coupling surface 42. Each of these connection channels 43 to 46 can be in fluidic communication with one of the two receiving bores 38, 39 or with the supply shaft 40 in a manner described in more detail below.

By way of example only, a sealing plate 47 is provided between the second coupling surface 42 and the connection area 13, which is, by way of example only, made of a rubber-elastic material. In accordance with the arrangement of the connection channels 43 to 46 in the channel plate 5, this sealing plate 47 is penetrated by bores 48, which thus ensure a fluidically communicating connection between the channel openings 14 and the connection channels 43 to 46 in the channel plate 5.

As can be seen from the schematic view in FIG. 4, the valve assembly 18 together with the pit 7 delimits a pressure chamber 30, which is in fluidic communication with the supply connection 31. A supply channel 52, a first control channel 53 and a second control channel 54 are configured in a nozzle carrier 51 associated with the valve assembly 18, the outer front surface of which forms the front surface 19 of the valve assembly 18. The supply channel 52 connects the supply connection 31 to the pressure chamber 30. The first control channel 53 connects the first valve connection 20 to a first valve seat 55. The second control channel 54 connects the second valve connection 21 to a second valve seat 56. A first valve member 57, which is configured as a rubber-elastic sealing element, for example, lies sealingly on the first valve seat 55 as shown in FIG. 4. In this case, the first valve member 57 is attached to a first piezo element 59, which is configured as a piezo bender and which is fixed to a cartridge housing 22 of the valve assembly 18 at an end region facing away from the first valve member 57. In the same way, as shown in FIG. 4, the second valve member 58, which is also configured as a rubber-elastic sealing element, bears sealingly on the second valve seat 56 of the nozzle carrier 51 and is coupled to a second piezo element 60, which is fixed at the end to the cartridge housing 22.

When an electrical voltage is applied to the first piezo element 59, a bending of the first piezo element 59 is caused, by which the first valve member 57 is lifted from the first valve seat 55, so that a fluidically communicating connection between the pressure chamber 30 and the first valve connection 20 is released. In the same way, this applies to the second piezo element 60, which can take up a curved position by means of an electrical voltage, in which the second valve member 58 is lifted from the second valve seat 56 in order to release a fluidically communicating connection between the pressure chamber 30 and the second valve connection 21. To provide these electrical voltages for the first piezoelectric element 59 and the second piezoelectric element 60, only schematically shown electrical connection lines 61 are provided, which are electrically connected to a control board 62. A control apparatus 63 is positioned on the control board 62, which comprises a microprocessor as well as a voltage generator in a manner not shown in detail and which is configured to control the power supply as a function of a control program running in the microprocessor and as a function of sensor signals described in more detail below, in order to cause the desired curvature of the first piezo element 59 and/or the second piezo element 60.

According to an alternative embodiment for the piezo elements, which is not shown, it is provided that these take up a curved position in a neutral position without the application of voltage, so that the respectively assigned valve members or sealing elements are lifted off the respective valve seats and, when an electrical voltage is provided, undergo a deformation by which the respectively assigned valve members or sealing elements are pressed onto the respective valve seat in a sealing manner.

As can also be seen from FIG. 4, purely by way of example, the channel plate 5 is provided with a total of four connecting channels 43 to 46, which can be connected in different configurations to the respective first and second valve connections 20, 21 of the associated valve assembly 18 and to the respective supply connections 31 of the respective valve assembly 18. It can also be seen from FIG. 4 that the total of four channel openings 14 are each connected via associated fluid channels 33 to 36 to the fluid couplings, referred to as fluid interfaces 73 to 76 and not shown in detail, for fluidic communication. Furthermore, it is provided that the fluid interfaces 73 to 76 are positioned on the coupling surface 77 of the support plate 2. As can be seen from FIG. 1, the two fluid interfaces 73 and 74 are positioned away from the fluid interfaces 75 and 76, which themselves are assigned to each valve module. To clarify the relationships between the fluid interfaces 74 to 76, they are shown in FIG. 4 in a common display plane.

As an example, it is provided that a silencer 78 is arranged at the first fluid interface 73, so that the associated first fluid channel 33 can be referred to as an exhaust air channel. A compressed air source 79 is arranged at the second fluid interface 74, so that the second fluid channel 34 can also be referred to as a supply channel. A first working line 80 of a compressed air consumer 82 is attached to the third fluid interface 75, so that the associated third fluid channel 35 can also be referred to as a first working channel. A second working line 81 of the compressed air consumer 82 is attached to the third fluid interface 76, so that the associated fourth fluid channel 36 can also be referred to as the second working channel. By way of example only, the compressed air consumer 82 is configured as a double-acting pneumatic cylinder and is intended to provide a bidirectional linear movement.

As shown in FIG. 4, the fluid channels 33 to 36 in the support plate 2 and the connection channels 43 to 46 in the channel plate 5 are synchronized in such a way that, for example, the compressed air provided by the compressed air source 79 is supplied to the first connection channel 43 through the second fluid channel 34. The channel plate 5 is configured in such a way that the compressed air from the compressed air source 79 is provided at the supply connections 31 of the two lower valve assemblies 18 positioned in the valve housing 6. By way of example only, the first valve connection 20 of all valve assemblies 18 is connected to the third connection channel 45, which is connected to the third fluid channel of the support plate 2 and which opens out at the third fluid interface 75, to which the second working line 81 of the compressed air consumer 82 is connected as shown in FIG. 4. Furthermore, it is provided that the first fluid channel 33 provided for venting is connected to the second connection channel 44 and this is connected to the supply connections 31 of the two upper valve assemblies 18 positioned in the valve housing 6. By way of example only, it is provided that the second valve connection 21 of all valve assemblies 18 is connected to the fourth connection channel 46, which is connected to the fourth fluid channel 36, with the fourth fluid channel 36 discharging at the fourth fluid interface 76. As an example, it is provided that the first working line 80 of the compressed air consumer 82 is connected to the fourth fluid interface 76. Due to the fluidic connection provided by the channel plate 5, the two lower valve assemblies 18 accommodated in the valve housing 6 are used for the freely selectable aeration of the first working line 80 and the second working line 81, respectively. The two upper valve assemblies 18 accommodated in the valve housing 6 are used for the freely selectable venting of the first working line 80 and the second working line 81, respectively.

The fluidic interconnection of the four valve assemblies is thus designed in such a way that both the aeration function and the venting function for each of the two working lines 80, 81 can be effected redundantly by two of the valve assemblies 18 in each case, so that maintenance of the respective aeration function or venting function is ensured even if one of the valve assemblies 18 fails, although a reduced flow rate must be accepted in this case.

In order to enable the flow processes for the compressed air consumer 82 to be measured, a throttle 65 comprising a defined flow resistance is positioned in the third fluid channel 35. A first pressure sensor 66 and a second pressure sensor 67 are positioned at each end region of the throttle 65 and are electrically connected to the control apparatus 63 via associated sensor lines 86, 87. Each of the two pressure sensors 66, 67 provides an electrical sensor signal to the control apparatus 63 via the associated sensor lines 86, 87, from which the control apparatus 63 can determine a pressure difference between the first pressure sensor 66 and the second pressure sensor 67 and can determine a flow rate through the third fluid channel 35 on the basis of the known flow resistance of the throttle 65.

A third pressure sensor 68 and a flow meter 69 are positioned in the fourth fluid channel, which are connected to the control apparatus 63 via sensor lines 88, 89 and which are also configured to provide sensor signals to the control apparatus 63. For example, the use of the combination of the third pressure sensor 68 with the flow meter 69 enables direct flow measurement in the fourth fluid channel 36.

As shown in FIG. 4, the pressure sensors 66 to 68 are each positioned at the end of a stub 93 to 96 on a mounting surface 100 of a sensor board 97, in which the sensor lines 86 to 89, which are only shown separately for reasons of presentation, are integrated in practice. Depending on the application, it may be necessary to seal the stub 93 to 96 fluid-tight with an associated pressure sensor 66 to 68, as shown in FIG. 4, or alternatively to insert a blind plug into the stub 93 to 96, provided that no pressure measurement or other measurement (temperature measurement, humidity measurement, etc.) is provided for the third fluid channel 35 or the fourth fluid channel 36. As can also be seen from FIG. 4, the mounting surface 100 of the sensor board 97 is positioned opposite a bottom side 50 of the support plate 2.

In addition, the control apparatus 63 is assigned a sensor line 90, which is provided with a plug connector 91 at the end. As shown in FIG. 4, a sensor cable 98 is plugged into the plug connector 91, which is used for an electrical connection between a position sensor 99 assigned to the compressed air consumer 82 and the control apparatus 63.

In the different embodiments of channel plates 24 to 27, as shown in FIGS. 5 to 8, the connection channels 43 to 46 formed in the respective channel plates 24 to 27 are provided with the indications P for the pressure supply, S for the venting, A for the first working connection and B for the second working connection, which were previously common in pneumatics. The assignment of the respective function to the respective connection channel 43 to 46 is thus identical to the schematic view shown in FIG. 4, but can also be selected in a different way if, for example, a reverse arrangement of silencer 78 and compressed air source 79 is made at the first fluid interface 73 and the second fluid interface 74.

Alternatively, it could also be possible to attach different compressed air sources or other sources for pressurized gases to both the first fluid interface 73 and the second fluid interface 74. Thus, for example, the valve module system can be used to deliver gas mixtures with variably adjustable proportions of compressed air and a pressurized gas.

The channel plates 24 to 27 are provided purely by way of example for coupling two valve assemblies 18. Depending on the application, a redundant coupling of four valve assemblies 18 can also be provided in the same way as in FIG. 4, in which case the connection configuration shown in each case is doubled, in particular mirrored, in the respective channel plate 24 to 27.

Figures 5, 6, 7, 8:
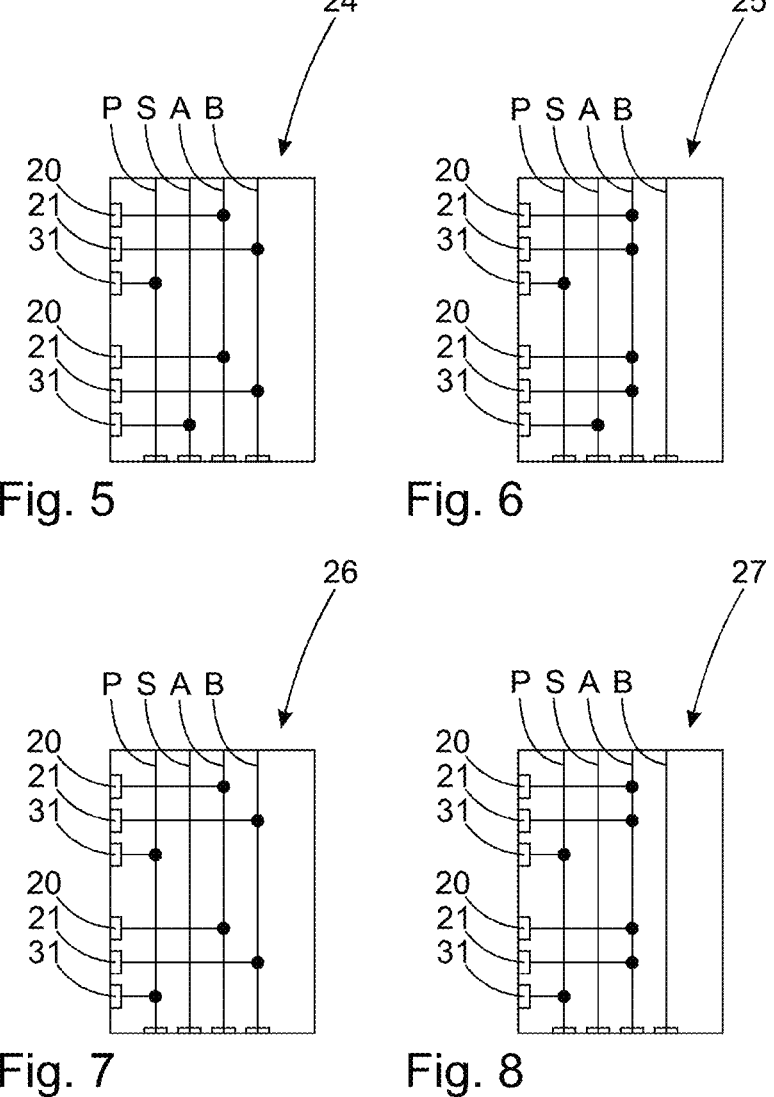

According to the first embodiment of a channel plate 24 as shown in FIG. 5, a supply connection 31 is connected to the first connection channel 43, a second supply connection 31 is connected to the second connection channel 44, the two first valve connections 20 are connected to the third connection channel 45 and the two second valve connections 21 are connected to the fourth connection channel 46. Accordingly, one valve assembly 18 is used as a venting valve for the two connection channels 45 and 46, while the other valve assembly 18 is used as an aeration valve for the two connection channels 45 and 46.

According to the second embodiment of a channel plate 25 as shown in FIG. 6, a supply connection 31 is connected to the first connection channel 43 and a second supply connection 31 is connected to the second connection channel 44. Furthermore, all valve connections 20, 21 are connected to the third connection channel 45, while the fourth connection channel 46 comprises no connection. With such a fluidic connection in the channel plate 25, an aeration and venting of a compressed air consumer not shown can be realized with double volume flow, wherein this compressed air consumer can be a single-acting pneumatic cylinder, for example.

According to the third embodiment of a channel plate 27 as shown in FIG. 7, both supply connections 31 are connected to the first connection channel 43 while the respective first valve connections 20 are connected to the third connection channel 45 and the respective second valve connections 21 are connected to the fourth connection channel 46. Thus, for example, fluid flow control can be carried out for two separate compressed air consumers that are fluidically connected to the third connection channel 45 or to the fourth connection channel 46.

According to the fourth embodiment of a channel plate 27 as shown in FIG. 8, both supply connections 31 are connected to the first connection channel 43, while all valve connections 20, 21 are connected to the third connection channel 45 and comprise no connection to the fourth connection channel 46. Thus, for example, a fluid flow control for a compressed air consumer with a flow cross-section that is double that of the channel plate 27 shown in FIG. 7 can be carried out.

In the assembly option shown in FIG. 9 for the sensor board 97 positioned below the support plate 2, it is provided purely as an example that the first stub 93 is closed with a blind plug 70 and that a temperature sensor 71 is assigned to the second stub 94. A pressure sensor 66 is assigned to the third stub 95 and a humidity sensor 72 is assigned to the fourth stub 96.

In the assembly option shown in FIG. 10 for the sensor board 97 positioned below the support plate 2, it is provided purely as an example that both the first stub 93 and the second stub 94 are closed with blind plugs 70 and that a temperature sensor 71 is assigned to the third stub 95 and a humidity sensor 72 to the fourth stub 96.

It is understood that different sensors can be assigned to each of the stubs 93 to 96 as required, in each case involving assembly options for the sensor board 97, while otherwise no changes, in particular to the support plate 2, are required.

What is claimed is:

1. A valve module system for supplying compressed air to a compressed air consumer, comprising: a support plate which support plate is provided with one or more interfaces at an interface area, each interface being configured for attaching a valve module and comprising a connection area which connection area is provided with a plurality of channel openings, wherein each channel opening is connected to a fluid channel provided in the support plate, and to one or more valve modules, wherein each of the valve modules comprises a valve housing in which valve housing one or more valve assemblies are accommodated and which valve housing is supported with a narrow side partly on the respective interface, and wherein the valve module system further comprises a channel plate, which channel plate is sealingly connected to the valve housing by a first coupling surface and which channel plate bears sealingly against the connection area by a second coupling surface aligned in particular parallel to the narrow side, a plurality of connection channels being formed in the channel plate, which plurality of connection channels are each formed for a connection between one of the valve assemblies and one of the channel openings, wherein at least one fluid channel formed in the support plate, which fluid channel opens out at a coupling surface of the support plate, which fluid channel is associated with a sensor from the group of: a pressure sensor, a temperature sensor, a flow sensor, a humidity sensor, which sensor is electrically connected to a control apparatus and which sensor is configured to provide an electrical sensor signal to the control apparatus, wherein the valve housing comprises one or more pits which one or more pits are aligned parallel to one another and whose pit openings are arranged in a common pit opening plane aligned transversely to the narrow side, the pits each accommodating valve assemblies which valve assemblies comprise a first valve connection and a second valve connection on a front surface arranged in the region of the pit opening, wherein in a first control channel associated with the first valve connection and in a second control channel associated with the second valve connection a valve seat and an electrically controllable valve member movable between a closed position for the valve seat and an open position for the valve seat is arranged, and wherein the channel plate comprises an individual fluidic connection of the first valve connection, the second valve connection and a supply connection with a respectively assigned connection channel for each valve assembly accommodated in the valve housing.

2. The valve module system according to claim 1, wherein the sensor is provided on a sensor board, which sensor board is fixed to the support plate.

3. The valve module system according to claim 1, wherein the sensor board is positioned on a bottom side of the support plate facing away from the interface area, and wherein a mounting surface of the sensor board opposite the support plate is equipped with a predetermined configuration of sensors, wherein the sensors are each fluidically communicatingly connected to the respective fluid channel.

4. The valve module system according to claim 3, wherein the sensor is connected to a sensor channel which sensor channel branches off from the fluid channel and which sensor channel opens out at the bottom side of the support plate, and wherein the sensor is accommodated in a sealing manner in an end region of the sensor channel.

5. The valve module system according to claim 1, wherein a fluid channel formed in the support plate comprises a throttle, wherein a first pressure sensor is configured to provide a first pressure-dependent electrical sensor signal and is assigned to a first end region of the throttle, and wherein a second pressure sensor is configured to provide a second pressure-dependent electrical sensor signal and is assigned to a second end region of the throttle, and wherein the first pressure sensor and the second pressure sensor are electrically connected with the control apparatus, which control apparatus is configured to process the first sensor signal and the second sensor signal.

6. The valve module system according to claim 1, wherein a fluid coupling is associated with the fluid channels discharging at the coupling surface.

7. The valve module system according to claim 6, wherein the connection area comprises a first orifice and an associated first fluid channel is connected to a first working connection arranged on the coupling surface, and wherein the connection area comprises a second orifice and an associated second fluid channel is connected to a second working connection arranged on the coupling surface, and wherein the connection area comprises a third orifice and an associated third fluid channel is connected to a first working connection arranged on the coupling surface, and wherein the connection area comprises a fourth orifice and an associated fourth fluid channel is connected to a second fluid connection arranged on the coupling surface.

8. The valve module system according to claim 7, wherein the first working connection is a compressed air connection.

9. The valve module system according to claim 7, wherein the second fluid connection is an exhaust air connection.

10. The valve module system according to claim 1, wherein a seal is arranged between the second coupling surface of the channel plate and the connection area, which seal is configured for individual sealing between the orifices and the respective associated connection channels.

11. The valve module system according to claim 10, wherein the seal is plate-shaped.

12. The valve module system according to claim 1, wherein the channel plate sealingly abuts against a valve housing front surface, through which valve housing front surface the pit openings pass, and which channel plate delimits with the pits a pressure chamber, in which pressure chamber the at least one valve assembly is accommodated.

13. The valve module system according to claim 1, wherein the valve assembly bears with a circumferential seal in a sealing manner against an inner surface of the pit, wherein the valve assembly delimits a pressure chamber with the pit, and wherein the supply connection is connected to the pressure chamber and is configured on the valve housing or on the front surface of the valve assembly, which supply connection communicates fluidically with a connection channel in the channel plate.

14. The valve module system according to claim 1, wherein the channel plate comprises a first connection channel, which first connection channel is connected to a first valve connection of a first valve assembly and to a first valve connection of a second valve assembly, a second connection channel, which second connection channel is connected to a second valve connection of the first valve assembly and to a second valve connection of the second valve assembly, a third connection channel, which third connection channel is connected to the supply connection of the first valve assembly, and a fourth connection channel, which fourth connection channel is connected to the supply connection of the second valve assembly.

15. The valve module system according to claim 1, wherein the channel plate comprises a first connection channel, which first connection channel is connected to a first valve connection and a second valve connection of a first valve assembly and to a first valve connection and a second valve connection of a second valve assembly, and a second connection channel, which second connection channel is connected to the supply connection of the first valve assembly and comprises a third connection channel, which third connection channel is connected to the supply connection of the second valve assembly.

16. The valve module system according to claim 1, wherein the channel plate comprises a first connection channel, which first connection channel is connected to a first valve connection of a first valve assembly and to a first valve connection of a second valve assembly, a second connection channel, which second connection channel is connected to a second valve connection of the first valve assembly and to a second valve connection of the second valve assembly, and a third connection channel, which third connection channel is connected to the supply connection of the first valve assembly and to the supply connection of the second valve assembly.

17. The valve module system according to claim 1, wherein the channel plate comprises a first connection channel, which first connection channel is connected to a first valve connection and a second valve connection of a first valve assembly and to a first valve connection and a second valve connection of a second valve assembly, and a second connection channel, which second connection channel is connected to the supply connection of the first valve assembly and to the supply connection of the second valve assembly.

18. The valve module system according to claim 1, wherein the valve member is connected to a piezo drive, and wherein the piezo drive is coupled to a power supply, which is electrically connected to the control apparatus, wherein the control apparatus is configured to provide control signals for controlling the piezo drive.

19. The valve module system according to claim 18, wherein the piezo drive is a piezo bender.

* * * * *